Dec. 20, 1932.  H. HEIDRICH, GEBOREN NOPPENZ  1,891,815
BODKIN FOR DRAWING MATERIAL THROUGH HOLLOW HEMS
Filed March 6, 1931
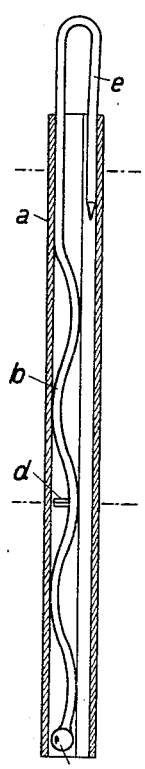
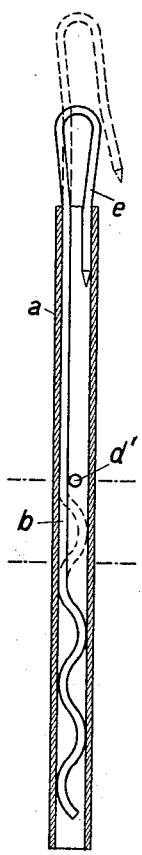
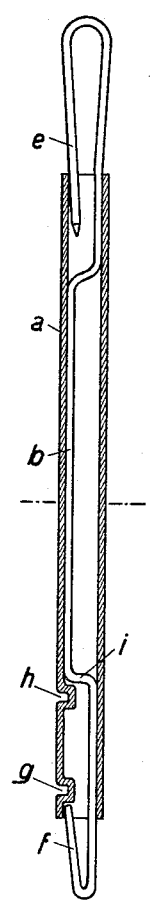
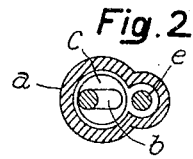
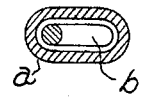
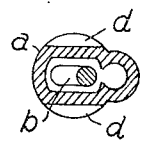
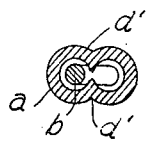
Inventor
H. Heidrich
Geb. Noppenz
by E. F. Wendiroth
Atty Patented Dec. 20, 1932

1,891,815

UNITED STATES PATENT OFFICE

HELENE HEIDRICH, GEBOREN NOPPENZ, OF DRESDEN, GERMANY

BODKIN FOR DRAWING MATERIAL THROUGH HOLLOW HEMS

Application filed March 6, 1931, Serial No. 520,679, and in Germany November 24, 1930.

The subject of the present invention is an improved bodkin or needle for drawing ribbons or the like through hollow hems.

The improved bodkin comprises in conjunction with a flat casing, a hook formed of wire for engaging the ribbon or the like and movable within limits in the casing in such manner that for the purpose of suitably inserting the ribbon or the like in the hook the point of the hook can be moved into position beyond the end of the casing. The width of the hooked portion is preferably somewhat greater than the internal dimensions of the casing so that the hooked portion when its point is moved outside the casing will spring apart and must be compressed somewhat on reinsertion. The external dimension of the casing may thus be kept small while permitting convenient insertion of the ribbon into the hook. The point of the hook may be passed through the end of the ribbon or cord in which case it is impossible for the ribbon or the like to slip off.

The invention will be understood from the following description and from the accompanying drawing illustrating three embodiments to enlarged scale.

In the drawing Fig. 1 is a vertical section through one embodiment, Fig. 2 being a section on the line 2—2 of Fig. 1 and Fig. 3 a section on the line 3—3 of Fig. 1. Fig. 4 is a vertical section through a second embodiment, Fig. 5 being a section on the line 5—5 of Fig. 4, and Fig. 6 a section on the line 6—6 of Fig. 4. Fig. 7 shows in vertical section the third embodiment, Fig. 8 being a section on the line 7—7 of Fig. 7.

Referring first to Figs. 1 to 3, $a$ is a casing of oval cross section (shaped say by pressing laterally an originally round or oval tube), so as to form in section two somewhat circular hollow spaces. The shank $b$ of the hook which shank is of sinuous form is movable in the large space with elastic friction produced by the waved form of the shank. The end of the shank has an enlargement $c$ approximately filling the corresponding space which enlargement on the hook being pulled out abuts against an internal projection $d$ in the casing which may be formed by nipping the casing on both sides. The point $e$ of the hook enters the smaller space in the casing when the hook is pushed inwards.

In the embodiment shown in Figs. 4 to 6 the casing $a$ in which the shank $b$ of the hook is movable with elastic friction, due to the sinuous form of the lower part, is of smooth oval section. Internal projections are provided at $d'$ which projections can be formed by pressing inwards the casing at both sides. These projections in conjunction with the uppermost wave of the shank serve to limit the extent of withdrawal of the hook.

In the embodiment shown in Figs. 7 and 8 the shank of the hook is not of sinuous form but is provided at its end with a resilient opposing hook $f$ which while the ribbon or the like is being drawn through the work presses against an internal projection $g$ on the casing and thus prevents unintentional withdrawal of the hook from the casing. An additional projection $h$ in co-operation with the hook $f$ acts similarly to the projections $d$ and $d'$ to prevent the withdrawal of the hook from the casing. The hook is in this instance provided with a cranked portion $i$ which presses against a projection $h$ and thereby limits the extent of inward movement of the hook into the casing.

This embodiment possesses the advantage that the hook $b$ is held firmly in the casing by its opposing hook $f$ and its cranked portion $i$ in co-operation with the two projections $g$ and $h$.

I claim:

1. A bodkin for drawing material through hollow hems comprising in combination with a flat casing a wire having a hooked portion movable in the casing to permit the hooked portion to be extended beyond the casing and means for limiting the movement of the wire, the hooked portion having a width somewhat greater than that of the casing, substantially as and for the purpose set forth.

2. A bodkin for drawing material through hollow hems comprising in combination with a flat casing, a hooked member movable in the casing, to permit the hook proper to be extended beyond the casing, said hooked member formed with a shank of sinuous form, and means for limiting the movement of the hooked member in the casing.

3. A bodkin for drawing material through hollow hems comprising in combination with a flat casing a hooked member movable in the casing to permit the hook proper to be extended beyond the casing, said hooked member formed with a shank of sinuous form, and means for limiting the movement of the hooked member in the casing, said means including an enlargement on the end of the shank and a projection on said casing co-operating with said enlargement.

4. A bodkin for drawing material through hollow hems comprising in combination with a flat casing, a hooked member movable in the casing to permit the hook proper to be extended beyond the casing, said hooked member formed with a shank portion of sinuous form, and means for limiting the movement of the hooked member in the casing, said means including an internal projection on the casing co-operating with the sinuous shank portion.

5. A bodkin for drawing material through hollow hems comprising in combination with a flat casing, a wire movable in the casing, said wire formed with a hook at one end to engage the material, an opposing hook at the other end of the said wire and a projection within the casing adapted to engage with the opposing hook.

6. A bodkin for drawing material through hollow hems comprising in combination with a flat casing, a wire movable in the casing, said wire formed with a hook at one end to engage the material, an opposing hook at the other end of the wire, a projection within the casing adapted to engage with the opposing hook, and a second projection limiting the withdrawal movement of the wire.

7. A bodkin for drawing material through hollow hems comprising in combination with a flat casing, a member of wire having a hook movable in the casing to permit the hook to be extended beyond the casing and means for limiting the movement of the wire, said means including a cranked portion on the wire and a projection within the casing.

8. A bodkin for drawing material through hollow hems comprising in combination a flat casing forming two sleeves, a hooked member slidably mounted in one of said pockets, the other pocket serving to receive the point of said hooked member and means for limiting the movement of the hooked member.

In testimony whereof I have signed my name to this specification.

HELENE HEIDRICH, geboren NOPPENZ.